ns Patent [19]

Pham

[11] Patent Number: 4,624,975
[45] Date of Patent: Nov. 25, 1986

[54] PROCESS FOR STABILIZING THE HYDROLYZABLE CHLORIDE CONTENT IN EPOXY RESINS

[75] Inventor: Ha Q. Pham, Richwood, Tex.

[73] Assignee: The Dow Chemical Company, Midland, Mich.

[21] Appl. No.: 778,587

[22] Filed: Sep. 20, 1985

Related U.S. Application Data

[63] Continuation-in-part of Ser. No. 714,290, Mar. 21, 1985, abandoned.

[51] Int. Cl.$^4$ .................. C08G 59/06; C08G 59/08
[52] U.S. Cl. .................................. 523/453; 525/507; 528/95; 528/491; 528/405; 549/516; 549/517; 549/202
[58] Field of Search .............. 549/516, 517, 202, 541, 549/542; 528/95, 491, 405, 501; 525/507; 523/453

[56] References Cited

U.S. PATENT DOCUMENTS

| | | | |
|---|---|---|---|
| 2,767,157 | 10/1956 | Masters | 528/95 |
| 3,325,452 | 6/1967 | McWhorter et al. | 528/95 |
| 3,417,050 | 12/1968 | Price et al. | 528/95 |
| 4,281,075 | 7/1981 | Chattha | 528/90 X |

*Primary Examiner*—Earl Nielsen
*Attorney, Agent, or Firm*—J. G. Carter

[57] ABSTRACT

The hydrolyzable halide content of glycidyl ethers prepared by dehydrohalogenating a halohydrin ether intermediate product in the presence of an organic solvent, washing the resultant product with water and distilling the solvent from the organic phase from the water wash step is stabilized when the distillation step is conducted in the presence of a sulfonic acid, sulfonic acid ester, organic sulfate or any combination thereof such as p-toluene sulfonate.

4 Claims, No Drawings

PROCESS FOR STABILIZING THE HYDROLYZABLE CHLORIDE CONTENT IN EPOXY RESINS

CROSS REFERENCE TO RELATED APPLICATION

This is a continuation-in-part application of Ser. No. 714,290 filed Mar. 21, 1985 now abandoned.

BACKGROUND OF THE INVENTION

The present invention pertains to a method for stabilizing the hydrolyzable chlorine content of glycidyl ethers.

In the electronics industry, epoxy resins are employed as encapsulating compounds, potting compounds, electrical laminates and the like. The electronics industry desires to employ epoxy resins which are low in hydrolyzable chloride content because their presence tends to reduce the electrical properties and reliability of the ultimate products. Most processes for producing epoxy resins of the glycidyl ether type involve reacting a hydroxyl-containing material with an epihalohydrin to form a halohydrin ether intermediate product. This product is then dehydrohalogenated with an alkali metal hydroxide in the presence of one or more organic solvents. The resultant product is then washed with water and the resultant organic phase is distilled to remove the organic solvent(s). This process usually produces a product low in hydrolyzable halide content. However, when the epoxy resin contains as little as 2 ppm of alkali metal base, the hydrolyzable halide content increases when subjected to heat for prolonged periods of time.

This is highly undesirable. The present invention provides a method for stabilizing the hydrolyzable halide content of an epoxy resin which contains residual quantities of alkali metal base.

SUMMARY OF THE INVENTION

The present invention pertains to an improvement in a process for preparing glycidyl ethers wherein (A) a composition containing one or more halohydrin ether groups is subjected to dehydrohalogenation with an alkali metal hydroxide or mixture thereof in the presence of one or more organic solvents, (B) washing the resultant composition with either water or a dilute aqueous solution of a weak inorganic acid or salt or a combination thereof; and (C) subjecting the organic phase from step (B) to distillation to remove the organic solvent(s); wherein said improvement resides in conducting step (C) in the presence of at least one sulfonic acid, sulfonic acid ester, organic sulfate or any combination thereof.

DETAILED DESCRIPTION OF THE INVENTION

In the present invention, any material containing at least one halohydrin ether can be employed. Suitable halohydrin ethers include those prepared by reacting one or more compounds having one or more hydroxyl groups per molecule with an epihalohydrin.

Suitable materials having at least one hydroxyl group per molecule include, for example, alcohols, glycols, polyoxyalkylene compounds having 1-4 hydroxyl groups per molecule, phenols, bisphenols, phenol-aldehyde novolac resins and the like.

Suitable epihalohydrins include, for example, epichlorohydrin, epibromohydrin, epiiodohydrin, methylepihalohydrin, mixtures thereof and the like.

Suitable catalysts for the preparation of the halohydrin ether product usually depends upon whether the hydroxyl groups to be reacted with the epihalohydrin is an aliphatic or an aromatic hydroxyl group. Lewis acids, such as boron trifluoride etherate is suitable or stannic chloride and the like are suitable for aliphatic hydroxyl groups whereas when the hydroxyl groups are aromatic, an ammonium halide, phosphonium halide or phosphonium carboxylate or phosphonium carboxylate carboxylic acid complex, phosphonium phosphate or an alkali metal hydroxide and the like are usually employed.

Suitable solvents which are usually employed include, for example, the alcohols, aromatic hydrocarbons, glycols, glycol ethers, combinations thereof and the like.

Suitable alkali metal dehydrohalogenating agents which are usually employed in the preparation of glycidyl ether compounds include, for example, sodium hydroxide, lithium hydroxide, potassium hydroxide, mixtures thereof and the like.

A particularly suitable method for preparing epoxy resins can be found in U.S. Pat. No. 4,499,255 by Wang, Bertram and Pham which is incorporated herein by reference.

Suitable sulfonic acids which can be employed herein include, for example, p-toluene sulfonic acid, methyl sulfonic acid, ethyl sulfonic acid, propyl sulfonic acid, butyl sulfonic acid, mixtures thereof and the like.

Suitable sulfonic acid esters which can be employed herein include, for example, methyl-p-toluene sulfonate, ethyl-p-toluene sulfonate, mixtures thereof and the like.

Suitable organic sulfates which can be employed herein include, for example, dimethyl sulfate, diethyl sulfate, dipropyl sulfate, dibutyl sulfate, mixtures thereof and the like.

The ester can be employed in quantities of from about 10 ppm to about 200 ppm, preferably from about 20 ppm to about 50 ppm parts by weight based upon the weight of resin.

The invention is illustrated by the following examples.

EXAMPLE 1

A. Preparation of Epoxy Resin

Into a one liter reaction vessel equipped with temperature and pressure control and indicating means, a means for continuous or intermittent addition of aqueous sodium hydroxide, a means for condensing and separating water from a codistillate mixture of water, solvent and epichlorohydrin and a means for returning the solvent and epichlorohydrin to the reaction vessel was added 103.8 grams (1 hydroxyl equivalent) of a phenol-formaldehyde novolac resin having an average phenolic hydroxyl functionality of about 3.6, 320 grams (4 equivalents) of epichlorohydrin and 92.5 grams of the methyl ether of propylene glycol (1-methoxy-2-hydroxy propane) as co-solvent. After stirring at room temperature and atmospheric pressure to thoroughly mix the contents, the temperature was raised to 65° C. and the pressure was reduced to 160 mm Hg absolute. To the resultant solution was continuously added 76 grams (0.95 equivalent) of a 50% aqueous sodium hydroxide solution at a constant rate over a period of 3 hours (10,800 s). During the addition of the sodium hydroxide, the water was removed by distilling with epichlorohydrin and solvent. The distillate was condensed thereby forming two distinct phases, an aqueous phase (top) and an organic epichlorohydrin-solvent phase (bottom). The organic phase was continuously returned to the reactor. After completion of the sodium hydroxide addition, the reaction mixture was maintained at a temperature of 65° C. and a pressure of about 160 mm Hg absolute for an additional 30 minutes (1800 s). The excess epichlorohydrin was then distilled off under vacuum until terminal conditions of 160° C. and 10 mm Hg absolute pressure was reached. The remaining resin and salt mixture was then dissolved into 142 grams of methyl isobutyl ketone. The hydrolyzable chloride content of the resin was determined to be 0.1% (1000 ppm). The resin solution was then heated to 80° C. and 0.48 grams of 50% aqueous sodium hydroxide was added (1.5 equivalents of sodium hydroxide per equivalent of hydrolyzable chloride). The solution was stirred vigorously at 80° C. for 2 hours (7200 s).

B. Stability Test

The contents from A were diluted to 23.2% non-volatiles with methyl isobutyl ketone. The resultant mixture was washed four times with 200 grams of water at 23° C. Phosphoric acid was added to the water employed in the 1st wash step to neutralize the residual base. The organic layer was filtered into two stripping flasks. To one flask was added 50 ppm based upon the weight of the glycidyl ether of methyl-p-toluene sulfonate as a 1000 ppm solution in methanol. The solvent was stripped from the contents of each of the flasks at 150° C. and 10 mm Hg absolute pressure for 10 minutes (600 s) under a full vacuum. The amount of hydrolyzable chloride was obtained for the epoxy resin product in each flask and thereafter, each of the epoxy resin products were subjected to a thermal stability test in an oven maintained at a temperature of 150° C. for 6 hours (21600 s). The results are given in the following Table I.

TABLE I

| [1]HYDROLYZABLE CHLORIDE CONTENT OF RESIN STRIPPED IN ABSENCE OF methyl-p-toluene sulfonate | | [2]HYDROLYZABLE CHLORIDE CONTENT OF RESIN STRIPPED IN THE PRESENCE OF methyl-p-toluene sulfonate | |
|---|---|---|---|
| Original | After 6 Hours in 150° C. Oven | Original | After 6 Hours in 150° C. Oven |
| 7 ppm | 111 ppm | 5 | 13 |

[1]Not an example of the present invention
[2]An example of the present invention

EXAMPLE 2

In a manner similar to Example 1, 104 g (1 hydroxyl equiv.) of a phenol formaldehyde novolao having an average phenolio hydroxyl functionality of 3.6 was reacted with 370 g (4 equiv.) of epichlorohydrin using 76.8 g (0.96 equiv.) of aqueous NaOH to obtain an epoxy novolac resin. After the excess epichlorohydrin was distilled off, methylisobutyl ketone, MIBK, (165 g) was added to dissolve the resin. The resin/MIBK mixture was heated to 80° C. and 1 g of 50% aqueous NaOH soution was added to post-treat the resin for 2 hours (7200 s). After the reaction was completed, $CO_2$ was added to neutralize the mixture and an additional 519 grams of MIBK was added to dilute the mixture to 20% non-volatiles. 200 g of water was added to wash the resin/MIBK mixture three times. The resulting MIBK/resin solution was then divided into three equal parts. In part A, no additive was added. In part B, p-toluene sulfonic acid in methanol was added to make 50 ppm p-toluene sulfonic acid based on resin weight. In part C, dimethyl sulfate was added to make 50 ppm dimethyl sulfate based on the resin. The three parts were then subJected to vacuum distillation to remove MIBK, with terminal conditions of 150° C. and <10 mm Hg pressure. The resultant resins were tested for hydrolyzable chloride stability in an oven set at 150° C. for 6 hours (21,600 s). The results @@are given in the following Table II.

TABLE II

| SAMPLE | STABILIER TYPE | PPM | HYDROLYZABLE CHLORIDE, ppm | | |
|---|---|---|---|---|---|
| | | | INITIAL | AFTER 6 HOURS | DIFFERENCE |
| Part A[1] | none | 0 | 70 | 120 | 50 |
| Part B[2] | p-toluene sulfonic acid | 50 | 70 | 75 | 5 |
| Part C[2] | dimethyl sulfate | 50 | 70 | 86 | 16 |

[1]Not an example of the present invention.
[2]An example of the present invention.

I claim:

1. In a process for preparing glycidyl ethers wherein (A) a composition containing one or more halohydrin ether groups is subjected to dehydrohalogenation with an alkali metal hydroxide or mixture thereof in the presence of one or more organic solvents, (B) washing the resultant composition with either water or a dilute aqueous solution of a weak inorganic acid or salt or a combination thereof; and (C) subjecting the organic phase from step (B) to distillation to remove the organic solvent(s); the improvement which comprises conducting step (C) in the presence of at least one sulfonic acid, sulfonic acid ester, organic sulfate or any combination thereof.

2. A process of claim 1 wherein said sulfonic acid, sulfonic acid ester or organic sulfate is employed in a quantity of from about 10 to about 200 parts per million parts by weight based upon the weight of the glycidyl ether.

3. A process of claim 2 wherein said sulfonic acid, sulfonic acid ester or organic sulfate is employed in a quantity of from about 20 to about 50 parts per million parts by weight based upon the weight of the glycidyl ether.

4. A process of claim 3 wherein step (C) is conducted in the presence of is methyl-p-toluene sulfonate, p-toluene sulfonic acid, dimethyl sulfate or mixture thereof.

* * * * *